(Model.)
W. I. ALVORD.
KNOB ATTACHMENT.
No. 330,188. Patented Nov. 10, 1885.
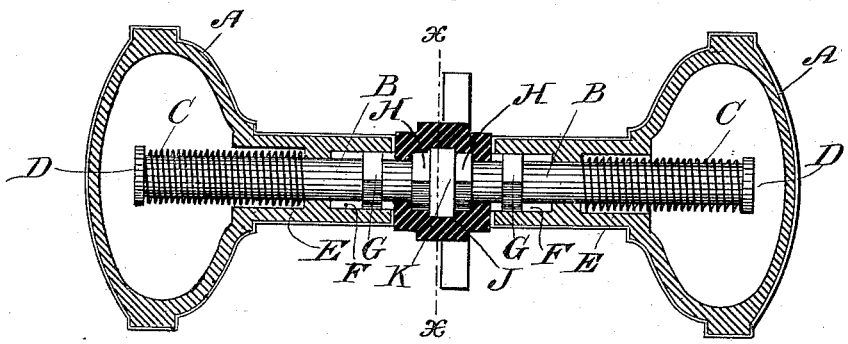
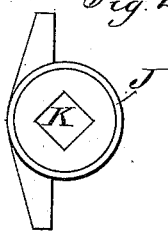
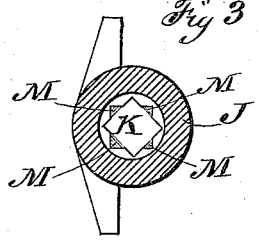
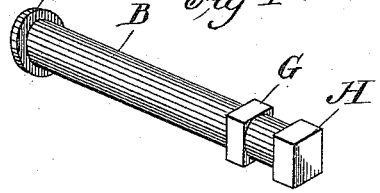
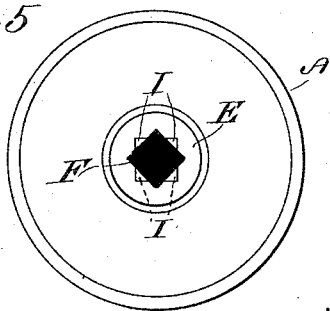
Witnesses
S. O. Williamson
W. T. Haviland
Inventor
Williston I. Alvord
By Smith & Hubbard
Attys.
N. PETERS, Photo-Lithographer, Washington, D. C.

UNITED STATES PATENT OFFICE.

WILLISTON I. ALVORD, OF BRIDGEPORT, CONNECTICUT.

KNOB ATTACHMENT.

SPECIFICATION forming part of Letters Patent No. 330,188, dated November 10, 1885.

Application filed April 16, 1885. Serial No. 162,406. (Model.)

*To all whom it may concern:*

Be it known that I, WILLISTON I. ALVORD, a citizen of the United States, residing at Bridgeport, in the county of Fairfield and State of Connecticut, have invented certain new and useful Improvements in Knob Attachments; and I do hereby declare the following to be a full, clear, and exact description of the invention, such as will enable others skilled in the art to which it appertains to make and use the same.

My invention relates to certain novel and useful improvements in knob attachments, and has for its object to provide such a device as shall be simple in construction and ready of attachment; and with these ends in view my invention consists in the details of construction hereinafter explained and then designated by the claims.

In order that those skilled in the art to which my invention appertains may fully understand my improvement, I will describe the same in detail, referring by letter to the accompanying drawings, forming a part of this specification, in which—

Figure 1 is a central longitudinal section of a pair of knobs attached to the latch-hub in accordance with my improvement; Fig. 2, a detail end view of the hub; Fig. 3, a detail section of the hub, taken at the line x x of Fig. 1; Fig. 4, a detail perspective of one of the knob-spindles, and Fig. 5 an end view of the knob-shank.

Similar letters denote like parts in all the figures of the drawings.

A are the knobs, within which are spindles B.

C are coil-springs around the spindles and confined by shoulders D on the extremities of the spindles and the knob-shanks E.

F are openings in the forward ends of the shanks E, square in cross-section.

G are square collars, formed integral with the spindles and contained in their assembled position within the openings F, into which they fit closely.

H are square heads, formed on the outer extremities of the spindles, at a short distance from the collars G.

I are rectangular recesses at the ends of the shanks E, and extending outwardly from the central lateral edges of the openings F. (See Fig. 5.)

J is the latch-hub, having central opening, K, the outer diameters of which are square in cross-section and adapted to contain the heads H. The central portion of this opening is large enough to permit the heads to turn freely therein. Upon either side of the central opening, K, are triangular cavities forming recesses M, eight-star-shaped in cross-section, and having four of the corners coincident and four alternating with the corners of the square openings outward through the end walls of the hub.

In adapting the spindles for insertion within the hub I proceed as follows: The spindles are pulled outward against the action of the springs until the square collars are beyond the shanks, when the spindles are given an eighth of a turn and then allowed to spring back within the recesses I. The method of attaching the knobs is as follows: The spindle is inserted within the square hole in the side of the hub until the head H has passed beyond the round part and within the enlarged central portion. The spindle is now given an eighth of a turn and pulled back until the corners of the head fit within the recesses M. The knobs are now pulled outward until the collars are beyond the shanks, when the knobs are turned so as to bring said collars into alignment with the square recesses F. The knobs are now released and the action of the springs brings the knobs snugly against the hub in operative position, as will be readily seen in Fig. 1. I do not wish to be confined to the exact shape of collars and heads shown, as any shape other than a circle will serve my purpose equally as well.

Having thus described my invention, what I claim as new, and desire to secure by Letters Patent, is—

1. In a knob attachment, the combination, with the knobs having recesses in their inner shank ends, of independent spring-actuated spindles having collars and heads, as described, the latch-hub having opening corresponding at the sides to the shape of the heads and enlarged at the central portion, and recesses formed in the inner end walls of said opening at the lateral edges of same, and adapted to contain said heads, substantially as described.

2. The combination of the knobs A, having in their shanks openings F and rectangular recesses E, extending from the outer lateral edges of said openings, spindles B, having shoulders D and heads H at their extremities, coil-springs C around said spindles and confined between the knob-shanks and the shoulders, collars G, formed integral with said spindles, hub J, provided with opening K, enlarged at the center and corresponding at its ends to said heads, and recesses formed in the end walls of the openings K, substantially as shown and described.

In testimony whereof I affix my signature in presence of two witnesses.

WILLISTON I. ALVORD.

Witnesses:
S. S. WILLIAMSON,
H. T. SHELTON, Jr.